(12) United States Patent
Yu

(10) Patent No.: US 7,537,232 B2
(45) Date of Patent: May 26, 2009

(54) REAR FRAME FOR BICYCLE

(75) Inventor: Kuo-Pin Yu, Taichung (TW)

(73) Assignee: Yuan Min An Enterprise Co., Ltd., Taichung (TW)

( * ) Notice: Subject to any disclaimer, the term of this patent is extended or adjusted under 35 U.S.C. 154(b) by 0 days.

(21) Appl. No.: 11/847,870

(22) Filed: Aug. 30, 2007

(65) Prior Publication Data
US 2008/0309049 A1 Dec. 18, 2008

(51) Int. Cl.
*B62K 3/02* (2006.01)
(52) U.S. Cl. .................................... 280/281.1; 280/274
(58) Field of Classification Search .............. 280/281.1, 280/274
See application file for complete search history.

(56) References Cited

U.S. PATENT DOCUMENTS

| 4,479,662 | A | * | 10/1984 | Defour et al. ............ 280/281.1 |
| 4,923,203 | A | * | 5/1990 | Trimble et al. ........... 280/288.3 |
| 5,456,481 | A | * | 10/1995 | Allsop et al. ............. 280/281.1 |
| 5,544,907 | A | * | 8/1996 | Lin et al. ................. 280/288.3 |
| 5,769,442 | A | * | 6/1998 | Robinson et al. ......... 280/281.1 |
| 6,129,962 | A | * | 10/2000 | Quigley et al. ............. 428/36.1 |
| 6,267,399 | B1 | * | 7/2001 | Buckmiller et al. ......... 280/274 |
| 6,955,372 | B1 | * | 10/2005 | Fritschen ................. 280/281.1 |
| 2003/0197346 | A1 | * | 10/2003 | Singenberger et al. ... 280/281.1 |
| 2007/0134456 | A1 | * | 6/2007 | Fritschen ................... 428/36.3 |
| 2008/0018075 | A1 | * | 1/2008 | Yu ............................. 280/274 |
| 2008/0054593 | A1 | * | 3/2008 | Vroomen et al. ......... 280/281.1 |

* cited by examiner

*Primary Examiner*—Paul N Dickson
*Assistant Examiner*—Tashiana Adams
(74) *Attorney, Agent, or Firm*—Browdy and Neimark, P.L.L.C.

(57) ABSTRACT

A rear frame for a bicycle is disclosed to include two tubes and a connecting portion. The tubes are respectively made of fiber reinforced material and have at least one rib therein. The connecting portion is connected between the tubes. By means of the aforesaid arrangement, the rear frame has a high mechanical strength and light weight.

5 Claims, 3 Drawing Sheets

REAR FRAME FOR BICYCLE

BACKGROUND OF THE INVENTION

1. Field of the Invention

The present invention relates to a bicycle and more particularly, to a rear frame for a bicycle, which has a high mechanical strength and light weight.

2. Description of the Related Art

The rear part of the frame of a bicycle includes seat stays and chain stays. The seat stays and the chain stays have a similar structure, i.e., both include two tubes approximately parallel to each other and a connecting portion connected between the two tubes. In order to reduce the weight of the seat stays or chain stays, carbon fiber reinforced materials are used. The seat stays and the chain stays are set to support the rear wheel after installation. Therefore, the seat stays and the chain stays must bear the vibration of the rear wheel. Frequently receiving the vibrating force from the rear wheel may cause the seat stays and the chain stays to deform or to break. In order to improve the structural strength, the consumption amount of carbon fiber cloth must be increased. However, increasing the consumption of fiber cloth correspondingly increases the weight of the seat stays and the chain stays.

SUMMARY OF THE INVENTION

The present invention has been accomplished under the circumstances in view. It is therefore the main object of the present invention to provide a rear frame for a bicycle, which has a high mechanical strength and light weight.

To achieve this and other objects of the present invention, the rear frame comprises two tubes and a connecting portion. The tubes are made of fiber reinforced material. The connecting portion is connected between the two tubes. The tubes each have at least one rib therein to reinforce the structural strength. Therefore, the invention achieves the desired structural strength without increasing material consumption.

BRIEF DESCRIPTION OF TILE DRAWINGS

DETAILED DESCRIPTION OF THE INVENTION

Figure 1:
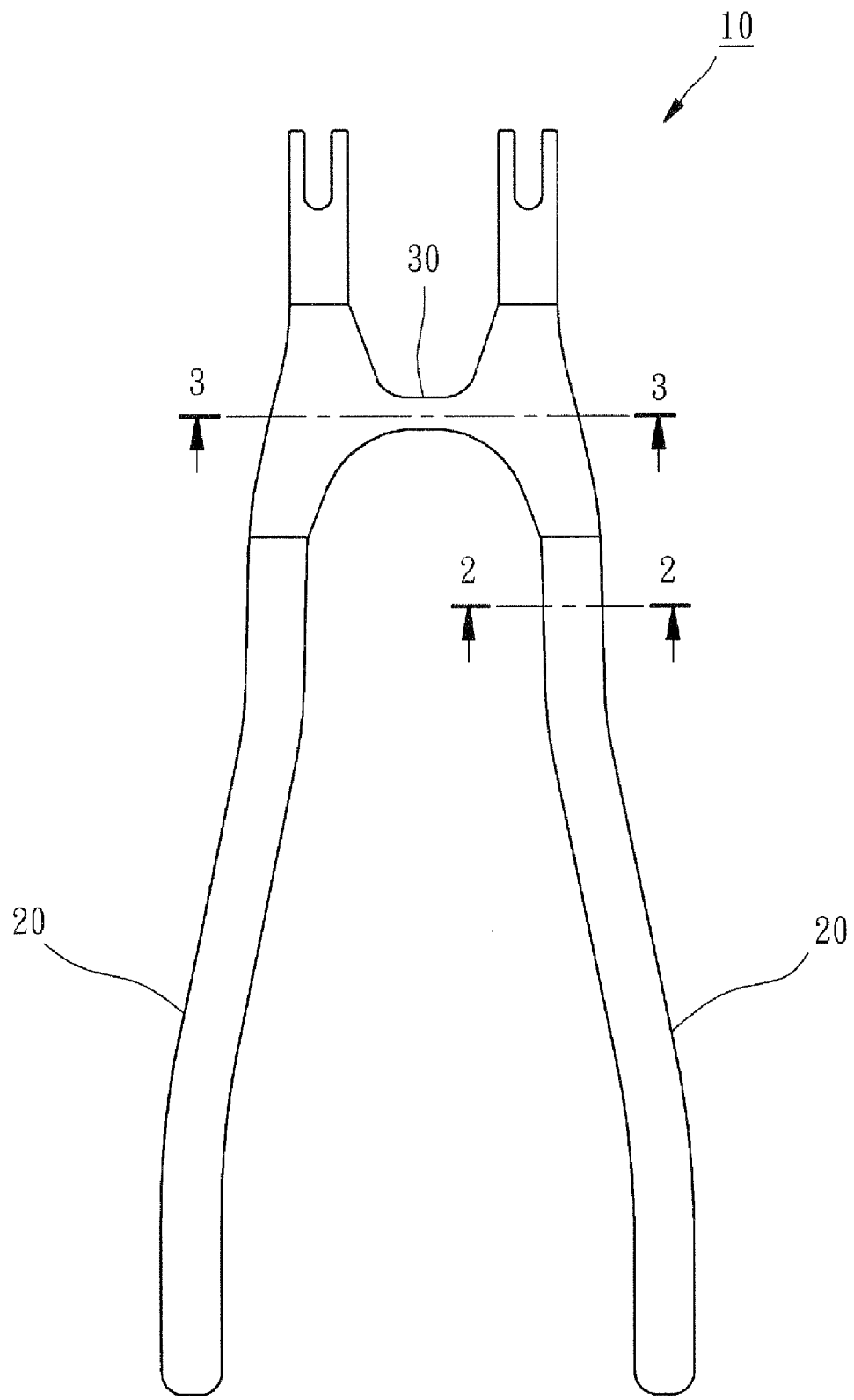
FIG. 1 is a front view of a rear frame for a bicycle in accordance with a first preferred embodiment of the present invention.
Figure 2:
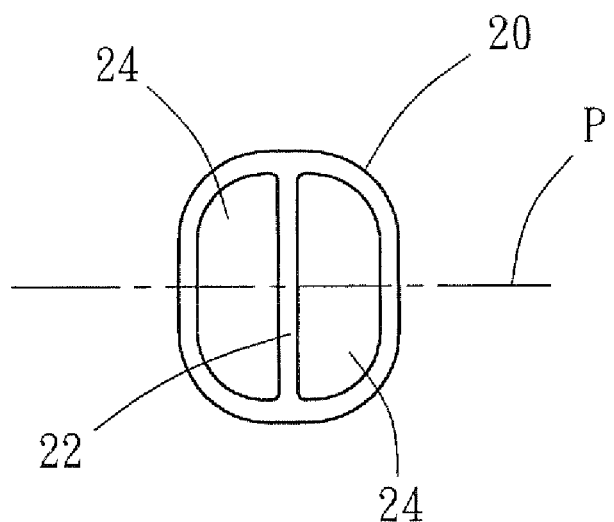
FIG. 2 is a sectional view taken along line 2-2 of FIG. 1.
Figure 3:
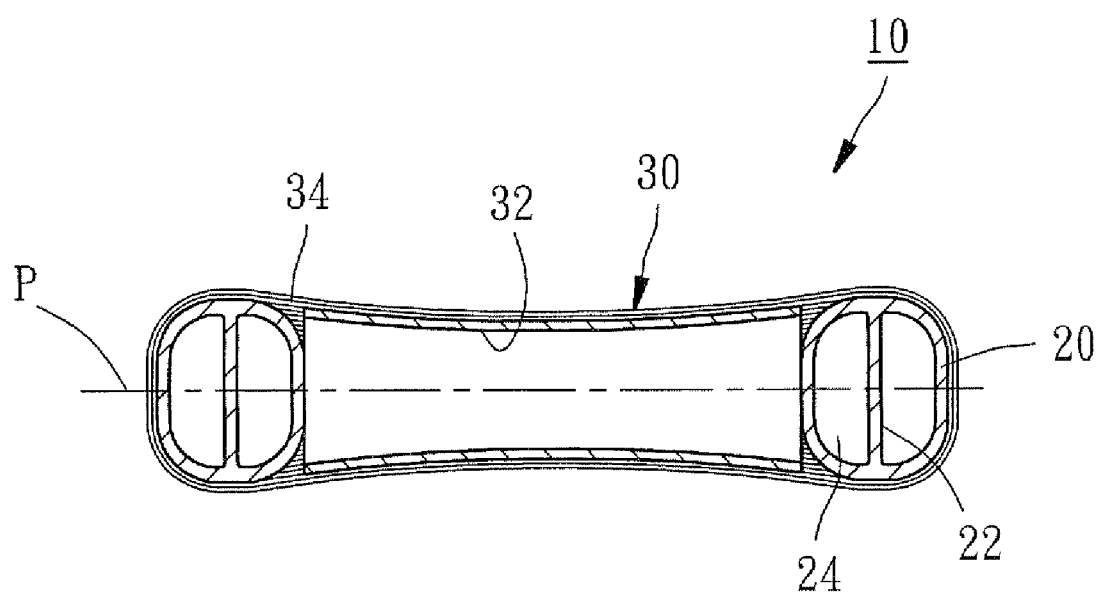
FIG. 3 is a sectional view taken along line 3-3 of FIG. 1.

Referring to FIGS. 1-3, a rear frame 10 for bicycle in accordance with the first preferred embodiment of the present invention is shown comprising two tubes 20 and a connecting portion 30. The rear frame 10 can be the seat stays or chain stays of a bicycle for connecting between the seat tube and the rear wheel.

The two tubes 20 are made of fiber reinforced resin. The fiber used can be carbon fiber, glass fiber, boron fiber or Kevlar fiber. The resin used can be thermosetting resin or thermoplastic resin. The two tubes 20 are substantially disposed on a same imaginary plane P. The two tubes 20 each have a rib 22 therein. The rib 22 divides the inside space of the respective tube 20 into two chambers 24. The rib 22 extends approximately perpendicular to the imaginary plane P.

The connecting portion 30 is connected between the two tubes 20 to join the two tubes 20 together. The connecting portion 30 is a tubular member made of fiber reinforced resin. During fabrication, the two tubes 20 are shaped and cured firstly. Then several pre-pregs are rolled up to form a tubular connecting member 32. The connecting member 32 is positioned between the two tubes 20. The connecting member 32 and the two tubes 20 are connected by winding pre-pregs 34 around the connecting member 32 and the two tubes 20. The connecting portion 30 is formed between the two tubes 20 after the connecting member 32 and the pre-pregs 34 are cured.

The ribs 22 greatly reinforce the mechanical strength of the tubes 20, enabling the tubes 20 to bear a greater external force, more particularly, the force in direction perpendicular to the imaginary plane P. Therefore, the mechanical strength of the whole structure of the rear frame 10 can be greatly increased without increasing the consumption of the fiber reinforced resin, or the desired mechanical strength of the rear frame 10 can be achieved with less material consumption, i.e., the rear frame 10 of the present invention has the advantages of light weight and high mechanical strength. The rib 22 of each tube 20 can be made in any of a variety of shapes.

Figure 4:
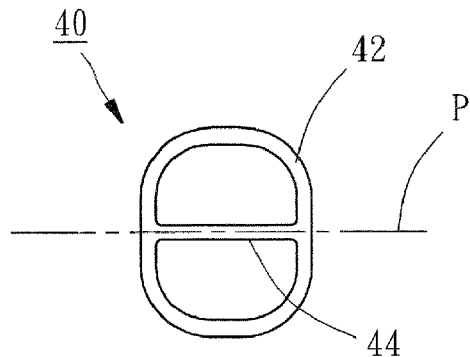
FIG. 4 is a sectional view of a rear frame in accordance with a second preferred embodiment of the present invention.

FIG. 4 shows a rear frame 40 in accordance with the second preferred embodiment of the present invention. According to this embodiment, the two tubes 42 are substantially disposed on an imaginary plane P, each having a rib 44 therein. The rib 44 extends approximately in parallel to the plane P. The ribs 44 greatly increase the structural strength of the tubes 42, enabling the tubes 42 to bear a high pressure, more particularly, the pressure in the direction in parallel to the plane P.

Figure 5:
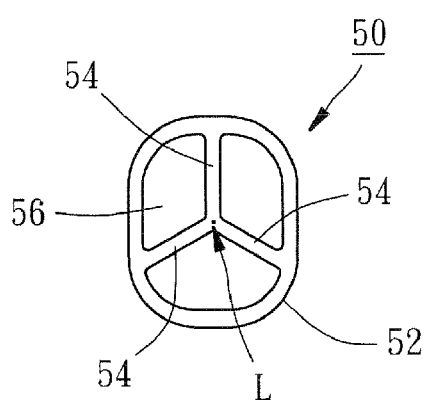
FIG. 5 is a sectional view of a rear frame in accordance with a third preferred embodiment of the present invention.

FIG. 5 shows a rear frame 50 in accordance with the third preferred embodiment of the present invention. According to this embodiment, each tube 52 has three ribs 54 therein. These three ribs 54 extend from the inner wall of the respective tube 52 and converge on a line L. These three ribs 54 divide the inside space of the respective tube 52 into three chambers 56. This design greatly increases the structural strength of the tubes 52 in all directions.

Figure 6:
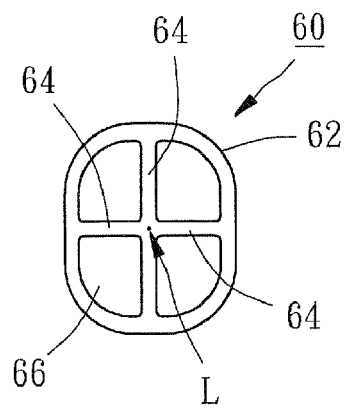
FIG. 6 is a sectional view of a rear frame in accordance with a fourth preferred embodiment of the present invention.

FIG. 6 shows a rear frame 60 in accordance with the fourth preferred embodiment of the present invention. According to this embodiment, each tube 62 has four ribs 64 therein. These four ribs 64 extend from the inner wall of the respective tube 62 and converge on a line L. These four ribs 64 divide the inside space of the respective tube 62 into four chambers 66. This design greatly increases the structural strength of the tubes 62 more even in all directions.

Figure 7:
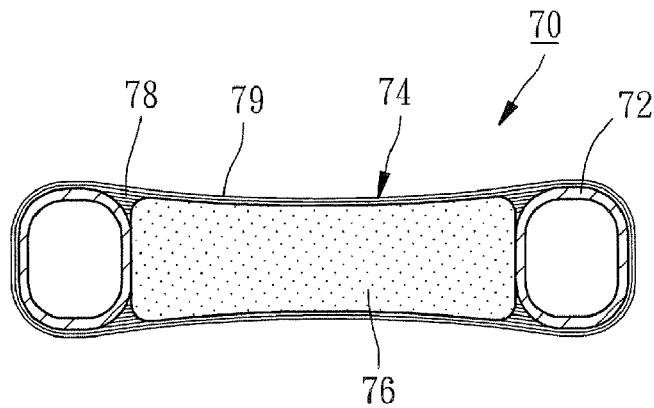
FIG. 7 is a sectional view of a rear frame in accordance with a fifth preferred embodiment of the present invention.

The connecting portion may be made by means of many other ways. FIG. 7 shows a rear frame 70 in accordance with the fifth preferred embodiment of the present invention. The rear frame 70 according to this embodiment comprises two tubes 72 and a connecting portion 74 connected between the two tubes 72. The fabrication of this rear frame 70 is outlined hereinafter. After the two tubes 72 made of fiber reinforced resin are cured, a connecting member 76 prepared from a foam core is positioned between the two tubes 72. The connecting member 76 and the two tubes 72 are connected by winding pre-pregs 78 around the connecting member 76 and the two tubes 72. The pre-pregs 78 forms a tubular member 79 and the connecting portion 74 is formed between the two tubes 72 after the pre-pregs 78 is cured. The tubular member 79 is stuffed with a foam core then.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A rear frame for a bicycle, comprising:
two tubes respectively made of fiber reinforced material each of which has at least one rib therein;
wherein the at least one rib divides an inside space of each of said two tubes into two equal chambers;
wherein said two tubes are disposed on a same imaginary plane and the at least one rib of said tubes extends substantially parallel to said imaginary plane;
a connecting portion connected between said tubes;
wherein said connecting portion has ends respectively fixed around and spaced below upper ends of said tubes and comprises a fiber reinforced tubular member engaged between the tubes and a cured pre-pregs connecting member wound around said tubular member and said tubes to fix said tubular member to said tubes.

2. The rear frame as claimed in claim 1, wherein the number of said ribs of each of said tubes is four; the four ribs of each of said tubes extend from an inner wall of the respective tube perpendicular to each other and divide the inside space of the respective tube into four equal chambers.

3. The rear frame as claimed in claim 1, wherein said tubular member is stuffed with a foam core.

4. A rear frame for a bicycle, comprising:
two tubes respectively made of fiber reinforced material each of which has at least one rib therein;
wherein the at least one rib divides an inside space of each of said two tubes into two equal chambers;
wherein said tubes are disposed on a same imaginary plane and the at least one rib of said tubes extends substantially perpendicular to said imaginary plane;
a connecting portion connected between said tubes;
wherein said connecting portion has ends respectively fixed around and spaced below upper ends of said tubes and comprises a fiber reinforced tubular member engaged between the tubes and a cured pre-pregs connecting member wound around said tubular member and said tubes to fix said tubular member to said tubes.

5. A rear frame for a bicycle, comprising:
two tubes respectively made of fiber reinforced material each of which has at least one rib therein;
wherein the at least one rib divides an inside space of each of said two tubes into two equal chambers;
wherein the number of said ribs of each of said tubes is three the three ribs of each of said tubes extend from an inner wall of the respective tube and converge on a line and divide the inside space of the respective tube into three chambers
a connecting portion connected between said tubes;
wherein said connecting portion has ends respectively fixed around and spaced below upper ends of said tubes and comprises a fiber reinforced tubular member engaged between the tubes and a cured pre-pregs connecting member wound around said tubular member and said tubes to fix said tubular member to said tubes.

* * * * *